Patented Mar. 22, 1938

2,111,802

UNITED STATES PATENT OFFICE 2,111,802

PIGMENT VEHICLE FOR PRINTING

Frank Graf Oswald, Manhasset, N. Y., assignor to John W. Masury & Son, Brooklyn, N. Y.

No Drawing. Application April 2, 1935, Serial No. 14,229

1 Claim. (Cl. 134—26)

This invention relates to a vehicle for pigments, in the form of a varnish, having novel properties, adapting it particularly for use in so-called "cold color" printing processes, one of which is disclosed in U. S. application Serial No. 704,456, filed Dec. 28, 1933. In such printing, as on glass, the thin film of ink is applied by the rollers over a relatively large superficial area. During the printing operation the ink must be kept in a mobile condition for ready and uniform application to the surface. During the baking which follows, the solvent is expelled and the varnish with the pigment sets. The resulting film must have firm adhesion, resistance to abrasion, toughness, and a high degree of infusibility and non-solubility in common solvents, dilute mineral acids and dilute alkaline solutions. Drying oil with resin, for instance, is not suitable, because if the proportions assure mobility the resulting film lacks adhesion and toughness, whereas if the proportions are such as to increase these properties, mobility is lost. Another factor which needs be considered in solving the problem presented by such "cold color" printing processes, is the correlation between the properties of pigments and the properties of the varnish. The varnish must be of such character that it will wet the pigments readily, inducing an even dispersion which will not be upset during storage or use of the ink. The pigments, too, must induce toughness in the ink film; they must be sufficiently non-abrasive to prevent undue wear on machined surfaces of the rolls and fountain in the press; and they must also have high heat resistance to withstand the baking. It is essential, of course, that the vehicle used shall not include any ingredient which would adversely affect the pigment, and that the volume of nonvolatile ingredients in the varnish shall be in a certain predetermined ratio in respect to the volume of the pigment, so that the latter may be effective for its purpose and yet held by a film having the properties indicated above.

The principal object of the present invention is to provide a varnish vehicle which shall be suitable for use with pigments employed in "cold color" printing on glass surfaces or the like.

In accordance with the invention a varnish is formed having a mobile oil solvent with a distilling range lying between 250° C. and 360° C., the volatility of which is sufficiently low at ordinary room temperatures to prevent rapid evaporation. The preferred solvents that have been found satisfactory are chlorinated diphenyl products and alpha-chlornaphthalene which is a chlorinated naphthalene product. These solvents when employed in my improved varnish vehicle in general accordance with the method of manufacture hereinafter indicated, may have a chemical reaction with some of the ingredients used, which promotes the desired properties of adhesion and toughness. The nature of this action cannot be demonstrated but the resulting film clearly has such properties to a greater degree than might be expected.

Of the chlorinated diphenyl products, four are commercially available, being designated as follows:

| | Distilling range °C. |
|---|---|
| Aroclor 1219 | 278–295 |
| Aroclor 1229 | 284–355 |
| Aroclor 1232 | 300–322 |
| Aroclor 1242 | 324–360 |

By way of example, there are set forth two methods of forming my improved vehicle, with properties which adapt it peculiarly for use with "cold color" printing inks.

*Example #1*

Weigh into varnish kettle:
2181 parts by weight raw tung oil.
Place on fire and heat to 450° F. in 15 minutes.
Remove from fire and add, with stirring:
1177 parts by weight heat-convertible phenolaldehyde varnish resin.
1002 parts by weight rosin-glycerol ester.
105 parts by weight rosin.
Stir until resins are melted. Replace on fire and raise temperature of batch to 320° F. in 10 minutes. Hold at 320° F. for 15 minutes. Remove from fire and add, with stirring:
755 parts by weight cooked tung oil.
173 parts by weight acid refined linseed oil.
932 parts by weight chlorinated diphenyl oil.
When cool, add, with stirring:
176 parts by weight lead naphthenate drier solution containing 16% lead metal by weight.
2 parts by weight cobalt naphthenate drier solution containing 4% cobalt metal by weight.

*Example #2*

Weigh into varnish kettle:
1000 parts by weight drying oil-fatty acid modified, heat convertible, alkyd varnish resin.
667 parts by weight chlorinated diphenyl oil.
Warm to 250° F. with stirring to uniform consistency.

I claim as my invention:

A non-volatile liquid vehicle for "cold color" printing requiring the application of heat to convert it into a hardened condition comprising by weight about 1177 parts of heat convertible varnish resin, about 1002 parts rosin-glycerol ester, about 105 parts of rosin, about 3109 parts of drying oil and about 178 parts of metallic drier dissolved in about 932 parts of chlorinated diphenyl having a distilling range lying between 278° and 360° C.

FRANK GRAF OSWALD.